US011745955B2

(12) United States Patent
Ford et al.

(10) Patent No.: US 11,745,955 B2
(45) Date of Patent: Sep. 5, 2023

(54) PRODUCT ENGAGEMENT SYSTEM FOR GROUPING AND MOVING CONTAINERS, RELATED SYSTEMS AND METHODS

(71) Applicant: Graphic Packaging International, LLC, Atlanta, GA (US)

(72) Inventors: Colin P. Ford, Woodstock, GA (US); Kelly W. Ziegler, Crobsy, MN (US); Jason C. Anderson, Marietta, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 17/563,543

(22) Filed: Dec. 28, 2021

(65) Prior Publication Data

US 2022/0204285 A1 Jun. 30, 2022

Related U.S. Application Data

(60) Provisional application No. 63/135,907, filed on Jan. 11, 2021, provisional application No. 63/131,535, filed on Dec. 29, 2020.

(51) Int. Cl.
*B65G 47/82* (2006.01)
*B65B 35/36* (2006.01)
*B65G 54/02* (2006.01)

(52) U.S. Cl.
CPC ............. *B65G 47/82* (2013.01); *B65B 35/36* (2013.01); *B65G 54/02* (2013.01); *B65G 2201/0235* (2013.01)

(58) Field of Classification Search
CPC .................. B65G 54/02; B65G 47/82; B65G 2201/0235; B65B 35/36

USPC .......................................................... 198/805
See application file for complete search history.

(56) References Cited

U.S. PATENT DOCUMENTS

| | | | | |
|---|---|---|---|---|
| 9,403,611 | B2 * | 8/2016 | Sacchetti | ............. B65G 47/842 |
| 9,834,392 | B2 * | 12/2017 | Raffaini | ............... B65G 47/082 |
| 2004/0112714 | A1 | 6/2004 | Davaillon | |
| 2010/0140052 | A1 | 6/2010 | Martini | |

(Continued)

FOREIGN PATENT DOCUMENTS

| | | |
|---|---|---|
| EP | 3 476 751 B1 | 4/2020 |
| WO | WO 2013/116651 A1 | 8/2013 |

OTHER PUBLICATIONS

International Search Report and Written Opinion for PCT/US2021/065332 dated Apr. 21, 2022.

*Primary Examiner* — James R Bidwell
(74) *Attorney, Agent, or Firm* — Womble Bond Dickinson (US) LLP

(57) ABSTRACT

A method of moving at least one container includes positioning at least one container at an upstream end of a system having at least one track assembly, a linear motor assembly, and at least one product engagement assembly, the at least one product engagement assembly having a shuttle member movably engaged with the linear motor assembly and the at least one track assembly, and an adapter assembly coupled to the shuttle member and comprising a product engagement member. The method further includes engaging the at least one container with the product engagement member, moving the at least one product engagement assembly at least partially along the linear motor assembly, and articulating the product engagement member relative to the shuttle member.

28 Claims, 14 Drawing Sheets

(56) References Cited

U.S. PATENT DOCUMENTS

| | | |
|---|---|---|
| 2013/0192956 A1 | 8/2013 | Lahogue et al. |
| 2015/0274342 A1* | 10/2015 | Zuccotti .................. B65B 7/28 53/133.2 |
| 2022/0227587 A1* | 7/2022 | Bonnain ................ B65G 54/02 |

* cited by examiner

PRODUCT ENGAGEMENT SYSTEM FOR GROUPING AND MOVING CONTAINERS, RELATED SYSTEMS AND METHODS

CROSS-REFERENCE TO RELATED APPLICATION

This application claims the benefit of U.S. Provisional Patent Application No. 63/131,535, filed on Dec. 29, 2020 and U.S. Provisional Patent Application No. 63/135,907, filed Jan. 11, 2021.

INCORPORATION BY REFERENCE

The disclosures of U.S. Provisional Patent Application No. 63/131,535, filed on Dec. 29, 2020, and U.S. Provisional Patent Application No. 63/135,907, filed Jan. 11, 2021, are hereby incorporated for all purposes as if set forth in its entirety.

BACKGROUND OF THE DISCLOSURE

The present disclosure generally relates to systems and methods for grouping and moving containers in a packaging machine. More specifically, the present disclosure is directed to methods and systems including product engagement assemblies for grouping and moving containers within or to a packaging machine.

SUMMARY OF THE DISCLOSURE

According to one aspect, the disclosure is generally directed to a method of moving at least one container, the method comprising positioning at least one container at an upstream end of a system having at least one track assembly, a linear motor assembly, and at least one product engagement assembly, the at least one product engagement assembly comprising a shuttle member movably engaged with the linear motor assembly and the at least one track assembly, and an adapter assembly coupled to the shuttle member and comprising a product engagement member. The method further comprises engaging the at least one container with the product engagement member, moving the at least one product engagement assembly at least partially along the linear motor assembly, and articulating the product engagement member relative to the shuttle member.

According to another aspect, the disclosure is generally directed to a system for moving at least one container, the system comprising at least one track assembly, a linear motor assembly, and at least one at least one product engagement assembly comprising a shuttle member movably engaged with the linear motor assembly and the at least one track assembly, and an adapter assembly coupled to the shuttle member and comprising a product engagement member movably coupled to the adapter assembly, the product engagement member configured for at least partially receiving at least one container.

According to another aspect, the disclosure is generally directed to a product engagement assembly for moving at least one container, the product engagement assembly comprising a shuttle member for being movably engaged with a linear motor assembly and at least one track assembly, and an adapter assembly coupled to the shuttle member and comprising a product engagement member movably coupled to the adapter assembly, the product engagement member configured for at least partially receiving at least one container.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of grouping and moving articles within or to a packaging machine. Such grouping and movement of articles can occur prior to and/or simultaneously with loading the articles into cartons, carriers, or other constructs. The system according to the present disclosure can accommodate articles of any shape. The articles can be containers, bottles, cans, etc. The articles can be used for packaging food and beverage products, for example. The articles can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

Figure 1:
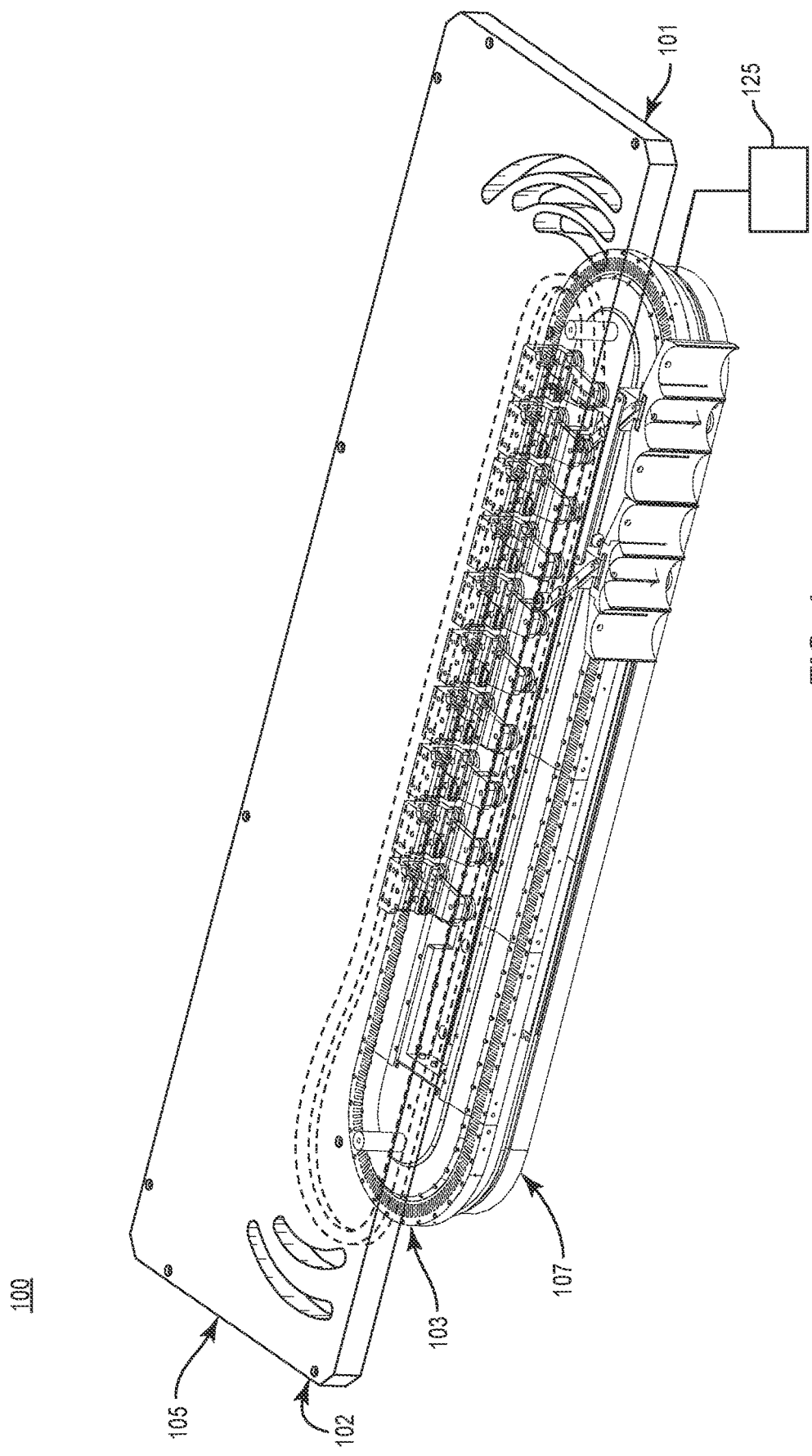
FIG. 1 is a perspective view of a product engagement system according to a first exemplary embodiment of the disclosure.

FIG. 1 generally illustrates a first exemplary embodiment of a system and method 100 for grouping and moving products or articles or containers C (FIG. 6A), for example, for being loaded into cartons or other constructs. In one embodiment, the system 100 can be included in a continuous packaging machine for packaging the articles C for storage, shipping, sale, etc. In another embodiment, the system 100 can be provided separately from a packaging machine, and can be placed in communication with an end or intermediate portion thereof. For example, the system 100 can group and move containers to a packaging machine, or, in one embodiment, can group and move containers along a packaging machine of which system 100 forms a portion, for loading into cartons or other constructs to form a package.

In the embodiments described herein, containers can include containers C, which can be, for example, aluminum cans or glass bottles. It will be understood that the system 100 is suitable for use with other types of containers without departing from the disclosure.

Containers C described herein can be positioned at an upstream end 101 of the system 100, for example, via a conveyor, feeder apparatus, lane combiner, and/or combinations thereof. In one embodiment, containers C can be positioned at the upstream end 101 of the system 100 manually by one or more operators. As described further herein, the containers C can be moved toward a downstream end 102 of the system 100. It will be understood that the system 100 can have a different directional orientation without departing from the disclosure.

Still referring to FIG. 1, the system can be a product grouping and movement system 100 that includes a linear motor assembly 103, an upper track assembly 105 positioned above the linear motor assembly 103, and a lower track assembly 107 positioned below the linear motor assembly 109. As described further herein, one or more product engagement assembly 111 is movably coupled to one or more of the linear motor assembly 103, the upper track assembly 105, and the lower track assembly 107.

Figure 2:
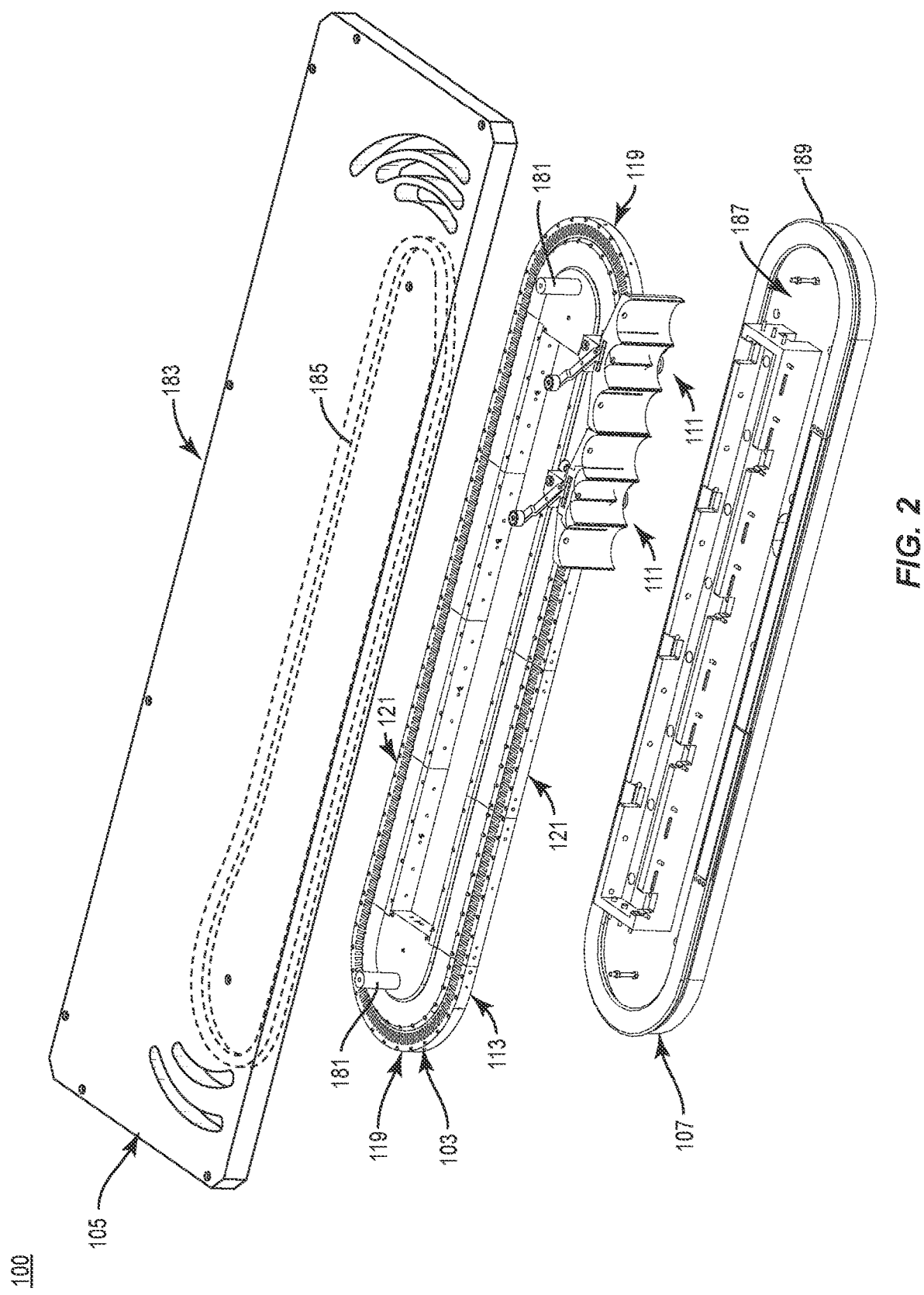
FIG. 2 is a parts-separated view of the system of FIG. 1.
Figure 3:
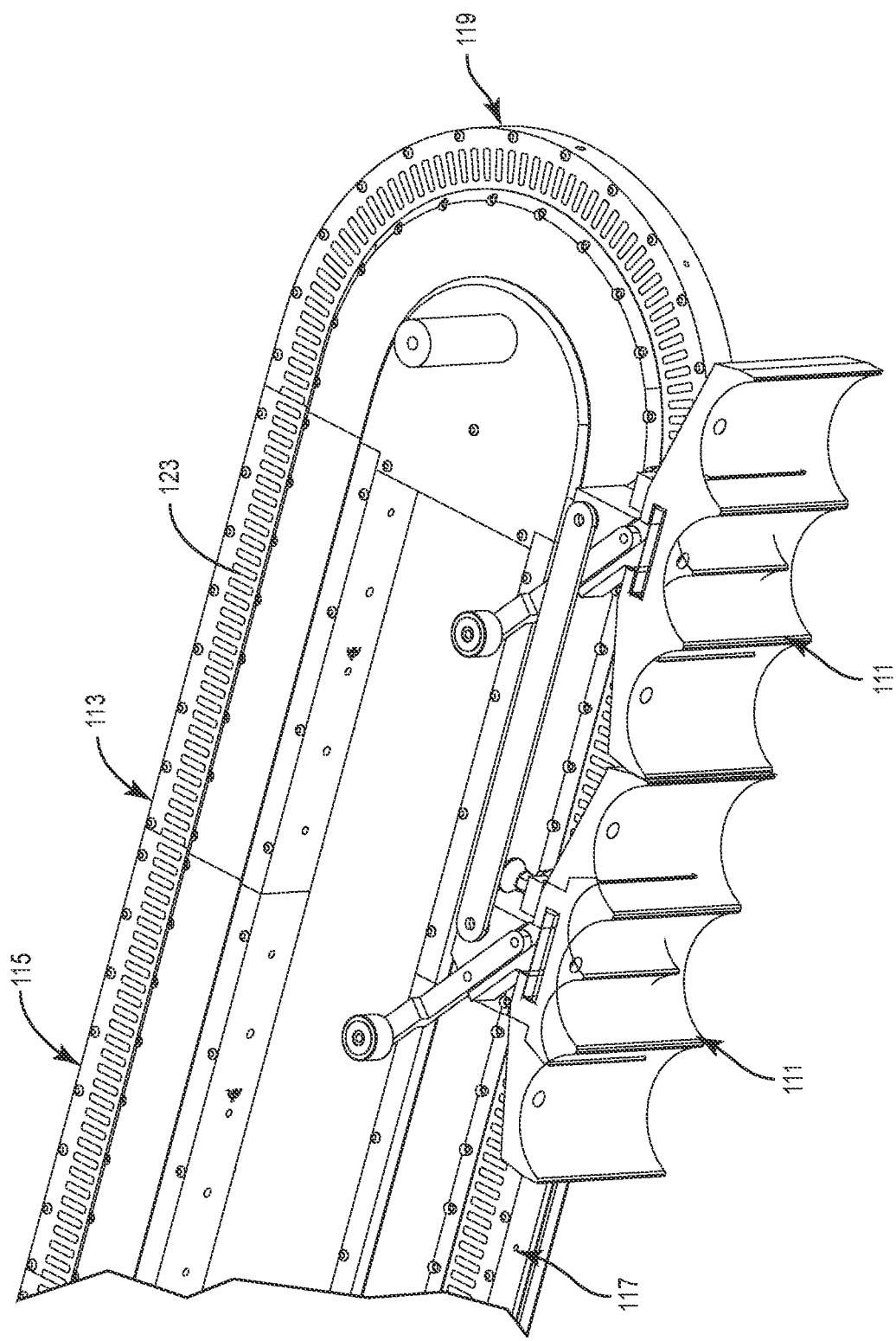
FIG. 3 is an enlarged perspective view of a linear motor assembly of the system of FIG. 1 with a pair of product engagement assemblies attached thereto.

Referring additionally to FIGS. 2 and 3, the linear motor assembly 103 can include a body 113 having a generally elliptical or ovoid top/bottom profile, e.g., so as to define a pair of opposed generally straight portions 115, 117 of the linear motor assembly 103 that extend between endpoints of respective opposed and generally curved portions 119, 121 of the linear motor assembly 103. While the body 113 of the linear motor assembly 103 can have a generally flat, e.g., disc-like, side profile, it will be understood that the body 113 can include/define one or more of raised, recessed, stepped, etc. portions. In one embodiment, the body 113 of the linear motor assembly 103 can be formed of modular members, e.g., interconnected sections, though it will be understood that the body 113 of the linear motor assembly 103 can be provided as a unitary structure without departing from the disclosure. In one embodiment, the linear motor assembly 103 can be a linear product transport such as the eXtended Transport System (XTS) available from Beckhoff Automation LLC of Savage, Minn.

The body 113 of the linear motor assembly 103 can support a plurality of spaced apart conductive coils 123, e.g., electrically conductive members configured and arranged to produce a magnetic field, as described further herein. In this regard, the coils 123 can have an at least partially curved profile, e.g., annular, wound, etc., and can be embedded within the body 113 of the linear motor assembly 103, disposed within channels formed within the body 113 of the linear motor assembly 103, or otherwise supported by the body 113 of the linear motor assembly 103.

As described further herein, upon receiving one or more electrical signals, one or more of the coils 123 of the linear motor assembly 103 can produce a magnetic field that causes one or more of the product engagement apparatuses 111 along the body 113 of the linear motor assembly 103. In this regard, the coils 123 of the linear motor assembly can be in electrical communication with one or more controllers 125 (FIG. 1) configured to provide one or more electrical signals thereto.

Figure 4:
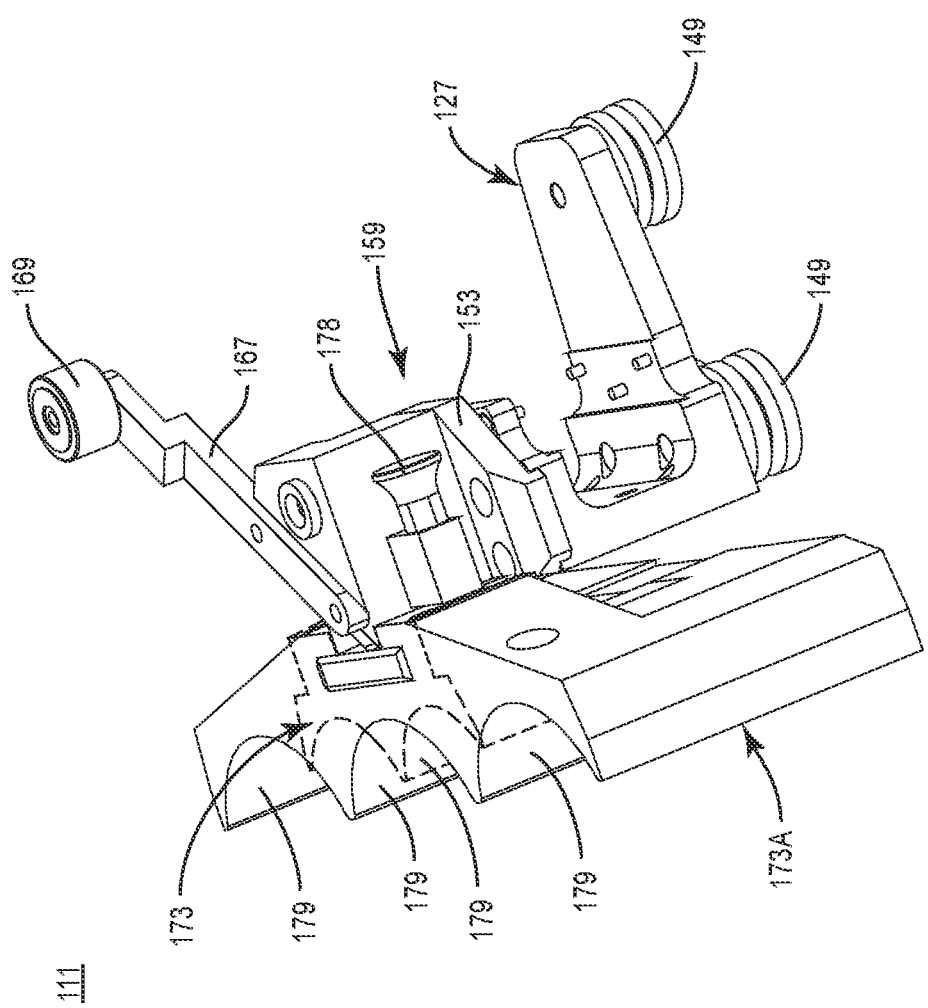
FIG. 4 is a perspective view of a product engagement assembly of the system of FIG. 1.
Figure 5:
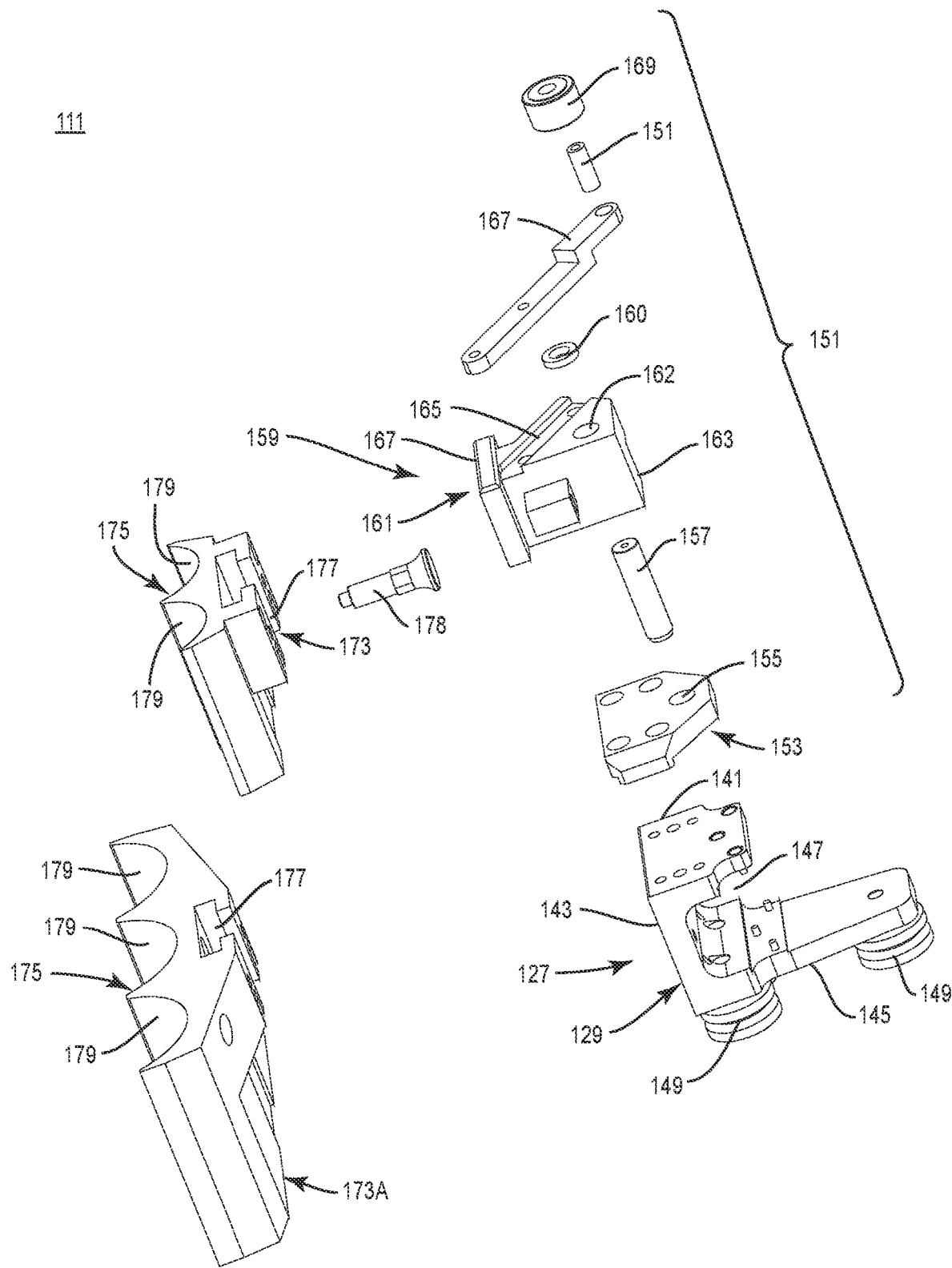
FIG. 5 is a parts-separated view of the product engagement assembly of FIG. 4.

With additional reference to FIGS. 4 and 5, one or more product engagement assembly 111 is configured to movably engage the linear motor assembly 103. Each product engagement assembly 111 can include a shuttle member 127 with a body 129 having an upper portion 141, a side portion 143, and a lower portion 145 arranged so as to define a channel 147 between the upper portion 141 and the lower portion 143. It will be understood that the body 129 of the shuttle member 127 can support one or more magnetic plates or other magnetic members for interacting with magnetic fields produced by the coils 123 of the linear motor assembly 103, as described further herein. In one embodiment, magnetic plates can be mounted on one or both of the upper portion 141 and the lower portion 145 of the body 129 of the shuttle member 127 along the channel 147. It will be understood that the magnetic members described herein can include permanent magnets and/or electromagnets, e.g., magnetic members resulting from an applied electric current.

A plurality of rollers 149, as shown, can be rotatably supported on the body 129, e.g., via mounting to an axel, pin, or other axial structure protruding downwardly from the body 129, or by an axial coupling member. As shown, at least a pair of the rollers 149 are arranged so as to form a space therebetween for at least partially receiving/engaging a portion of the lower track assembly 107, as described further herein.

An adapter assembly 151 can be removably coupled to each shuttle member 127, e.g., so as to form a modular, e.g., replaceable or otherwise reconfigurable, portion of the system 100. In the illustrated embodiment, the adapter assembly 151 can include an adapter plate 153, as shown, can be supported on the upper portion 141 of the shuttle member, and can include a series of apertures, e.g., for receiving fasteners for coupling the adapter plate 153 to the shuttle member 127. The adapter plate 153 can also include a centrally or otherwise positioned aperture 155 for at least partially receiving a pin 157 therethough.

The adapter assembly 151 can also include a mount 159 rotatably mounted on the adapter plate 153. The mount 159 can include a body 161 defining a bore 162 or recess on a lower portion thereof for at least partially receiving the pin 157 such that the mount 159 is rotatable about the pin 159 relative to the adapter plate 153. In one embodiment, the mount 159 can be further secured to the adapter plate 153 with a fitting 160 such that the mount 159 is positioned between the fitting 160 and the adapter plate 163. As also shown, the body 161 of the mount 159 can include a base portion 163 defining a channel 165 along an upper portion thereof, and an extension 167 extending outwardly from the base portion 163.

As shown, the channel 165 in the upper portion of the mount 159 can at least partially receive an arm 167 extending away from the mount 159 and supporting a roller 169 at a free end thereof. In one embodiment, the roller 169 can be secured to the arm 167 with a fastener 171, for example, inserted through an aperture in the arm 167. As described further herein, the arm 167 supports the roller 169 to movably engage a portion of the upper track assembly 105 of the system 100.

Still referring to FIGS. 4 and 5, the adapter assembly 151 can also include a product engagement member 173 having a body 175 defining a channel 177 on a back portion thereof for removably receiving the extension 167 of the mount 159 so as to couple the product engagement member 173 to the mount 159. The body 175 of the product engagement member 173, as shown, can define at least one recessed portion 179 for engaging respective containers C. In the illustrated example, the at least one recessed portion 179 can be an at least partially curved surface of the product engagement member 173 so as to at least partially contour/engage/receive a cylindrical portion of a container, e.g., a can or bottle. In one embodiment, the body 175 of the product engagement member 173 can be at least partially formed from a flexible/resilient material, e.g., a polymeric material, so as to provide a gripping or compressive engagement with a respective container C.

As also shown, the product engagement member 173 can be provided with a pair of recessed portions 179 to engage a respective pair of containers C. It will be understood that the product engagement member 173 can be configured to engage a different number of containers C. For example, an alternative configuration of the product engagement member 173, generally designated 173A, is illustrated as provided with three recessed portions 179 so as to be configured to engage three respective containers C. It will be understood that a product engagement member can be provided with a different plurality of recesses 179 for engaging a desired plurality of containers C, or could be provided with a single recess 179.

As also shown, a locking pin 178 other fastener component can be at least partially inserted into an aperture in the mount 159 and an aperture in the product engagement member 173 to facilitate disconnection thereof, e.g., for replacement of the product engagement member 173. In one embodiment, such fastener component can include a collar with a biasing member urging an internal component, e.g., a bearing or other component, into locking engagement with an interior surface of a bore in the product engagement member 173. In this regard, the locking pin 178 can to facilitate quick release of the product engagement member 173 to the remainder of the product engagement assembly 111.

Referring again to FIGS. 1 and 2, when the system 100 is assembled, linear motor assembly 103 can be positioned between the upper track assembly 105 and the lower track assembly 107. As shown, the upper track assembly 105 can be coupled to/spaced apart from the linear motor assembly 103 via one or more spacing members 181, and a protruding portion of the lower track assembly 107 can be at least partially received in an opening in the body 113 of the linear motor assembly 103 so as to couple/space apart the linear motor assembly 103 and the lower track assembly 107.

The upper track assembly 105, as shown, can include a body 183 defining a cam track 185 within which the respective rollers 169 supported on the respective arms 167 of the respective product engagement apparatuses 111 can be at least partially received to roll along surfaces of the cam track 185 as the product engagement apparatuses 111 move along the system 100.

As also shown, the lower track assembly 107 can include a body 187 supporting/defining a flanged rail 189 protruding upwardly therefrom. When the system 100 is assembled, the flanged rail 189 can be at least partially received in space between the rollers 149 extending downwardly from the product engagement apparatuses 111 such that the rollers 149 can roll along a respective surface of the rail 189 as the product engagement apparatuses 111 move along the system 100.

Furthermore, the channel 147 defined by the respective shuttle members 127 can be positioned to at least partially surround/receive an outer periphery of the body 113 of the linear motor assembly 103. In this regard, the engagement of the rollers 169 at the upper portions of the respective product engagement apparatuses 111 with the upper track assembly 105 and the engagement of the rollers 149 with the lower track assembly 107 can maintain the shuttle member 127 in a substantially low-friction relationship with the body 113 of the linear motor assembly 103. In one embodiment, the outer periphery of the body 113 of the linear motor assembly 103 can be at least partially received within the channel 147 of the respective shuttle members 127 substantially free from contact with the shuttle members 127, though it will be understood that the shuttle members 127 can be in at least partial contact with the body 113 of the linear motor assembly 103 without departing from the disclosure.

As described above, a controller 125 can be provided in electrical communication with the system 100, e.g., via a wired and/or wireless electrical connection. Such controller 125 can include a processor configured to implement one or more instructions stored on a non-transitory storage medium, and can be configured for operator input and/or manual control. In this regard, the controller 125 can be or can form a part of a software program running on a computer, a programmable logic controller (PLC), another processor-implemented controller, or other control feature as will be understood by those skilled in the art.

In this regard, in one embodiment, the system 100 can be operated via transmitting, by the controller 125, one or more electrical signals to energize one or more of the coils 123 to produce a one or more resulting magnetic fields. It will be understood that the magnitude and orientation of such magnetic field(s) can be selected based on the electrical signal transmitted from the controller 125. Furthermore, the coils 123 can be energized in a coordinated manner, e.g., to produce a desired arrangement of magnetic fields across the linear motor assembly 103, to optimize power consumption, etc.

Figure 6A:
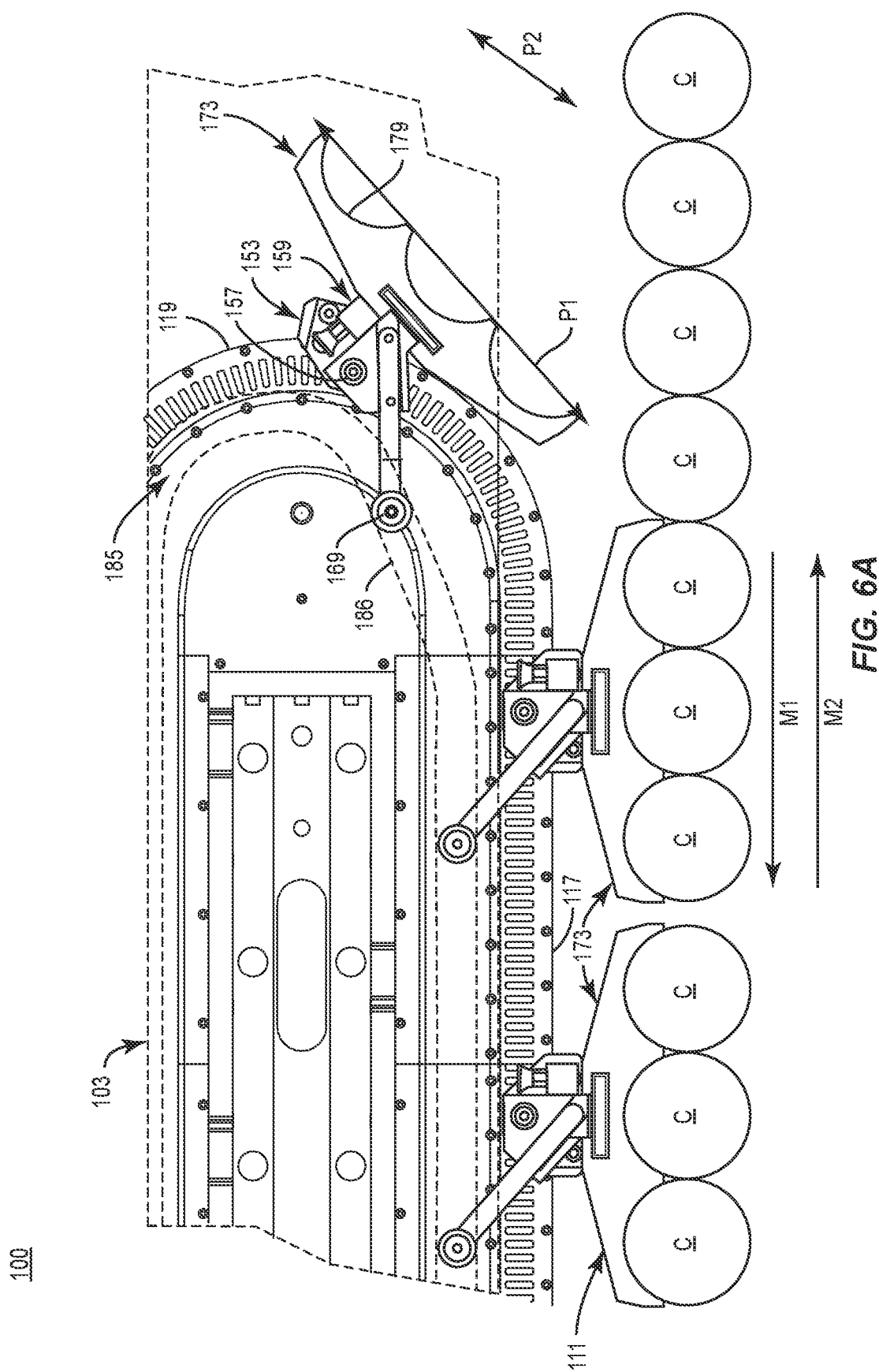
FIGS. 6A-6C are plan schematic views illustrating operations of the system of FIG. 1 to engage, move, and disengage containers.

Such selective activation of the coils 123 is such that a desired magnetic field and/or series/arrangement of magnetic fields can be produced to influence one or more magnetic elements, e.g., magnetic plates, mounted on the respective product engagement apparatuses 111 to propel the product engagement apparatuses 111 to move in a desired direction of motion along the linear motor assembly 103. In the illustrated embodiment, such direction of motion can be generally counterclockwise such that the straight portions 117, 115 of the linear motor assembly define a respective downstream machine direction M1 and upstream machine direction M2 (FIG. 6A). It will be understood that the coils 123 can be signaled to produce magnetic fields causing the product engagement members 111 to move in a different path along the linear motor assembly 103.

Figure 6B:
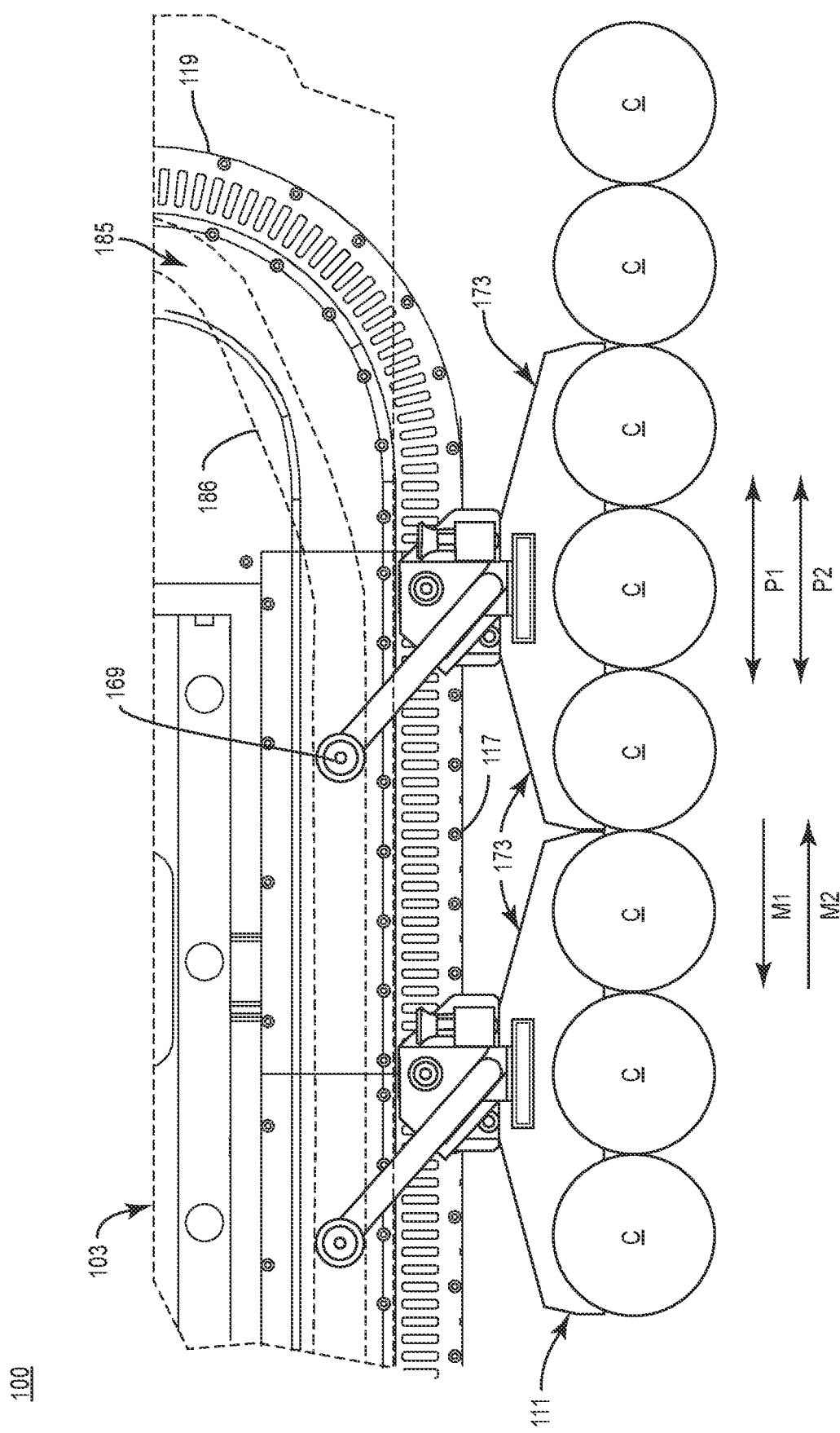
Figure 6C:
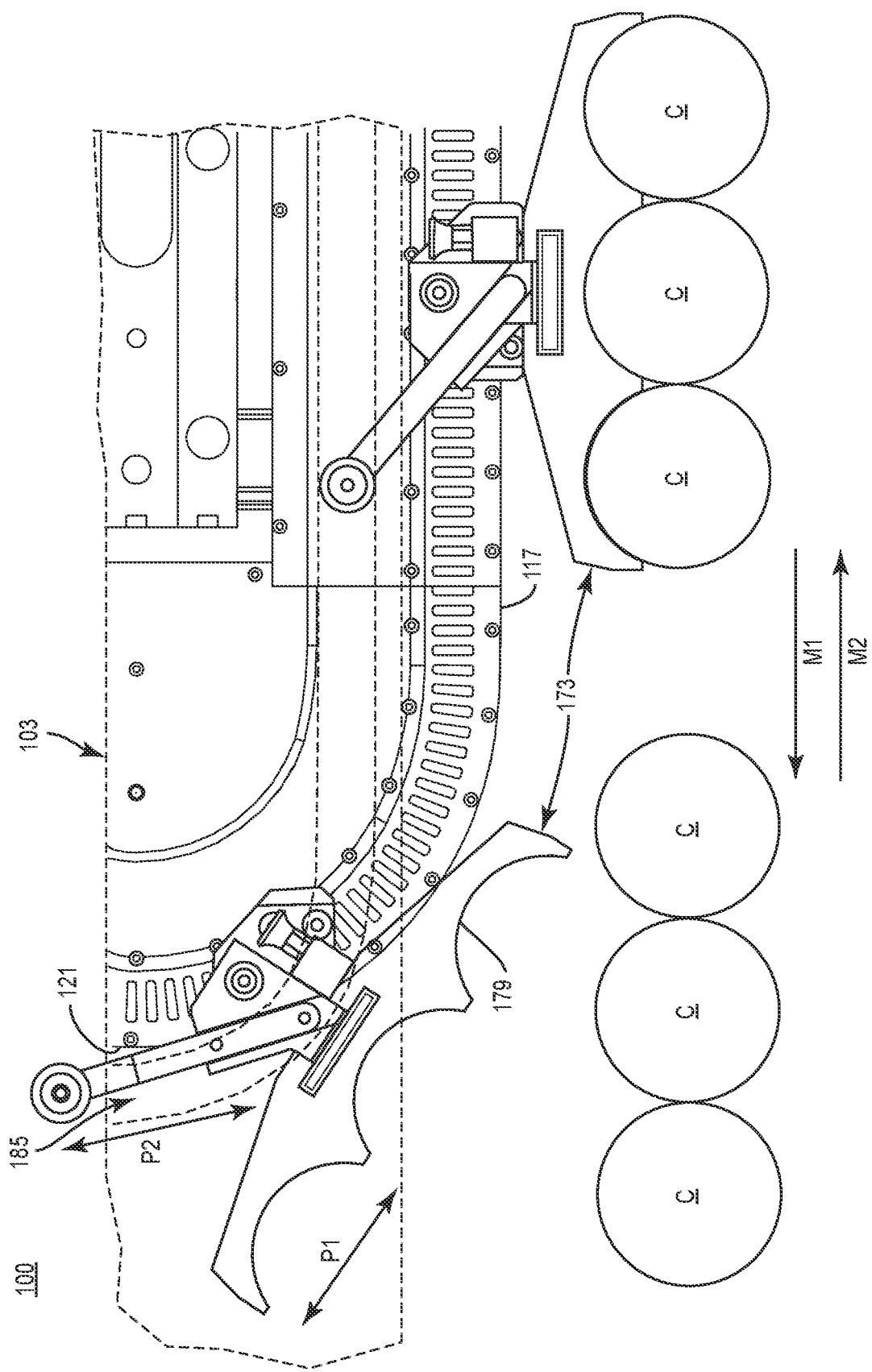

Referring additionally to FIGS. 6A-6C, engagement/grouping, movement, and disengagement of containers C by the system 100 will be described according to an exemplary embodiment of the disclosure.

As containers C are fed into the system 100 in the downstream machine direction M1 so as to pass in proximity to the path of the product engagement apparatuses 111, the movement of the respective rollers 169 along the cam track 185 of the upper track assembly 105 can direct the orientation of the product adapter assemblies 151 of the respective product engagement apparatuses 111. For example, as the rollers 169 move along a portion of the cam track 185 that diverges from the edge profile of the body 113 of the linear motor assembly 103, the rollers 169 can push or pull the respective arms 167 to engage the sides of the channel 165 of the respective mounts 159 and thereby cause the mounts 159 to rotate about the pins 157 relative to the adapter plates 163/shuttle members 127.

In this regard, and as shown, a portion 186 of the cam track 185 in the upper track assembly 105 adjacent the curved portion 119 of the linear motor assembly 103 can diverge away from the edge of the linear motor assembly 103 to cause the mount 159 to rotate about the pin 157, e.g., such that the product engagement member 173 is tilted away from an orientation that is tangential to the path of movement of the product engagement assembly 111 around the linear motor assembly 103.

In the illustrated embodiment, an outward portion of the product engagement member 173, e.g., protruding vertical edges/surfaces/portions of the product engagement member 173 adjacent respective recessed portions 179 can define a first plane P1 that is obliquely arranged relative to a second plane P2 defined by a vertical outside edge/surface/portion of the body 113 of the portion of the linear motor assembly 103 to which the product engagement assembly 111 is engaged/overlapping (planes P1 and P2 illustrated in 2-D analog in the illustrated embodiment).

Accordingly, the aforementioned tilt/articulation/pivoting of the product engagement members 173 relative to the shuttle members 127 as a product engagement members 173 approaches the straight portion 117 of the linear motor assembly 103 can create a clearance such that the product engagement member 173 is free from engagement with containers C adjacent the straight portion 117 of the linear motor assembly until the roller 169 engages a portion 186 of the cam track 185 that urges the mount 159 to rotate about the pin 157 such that the plane P1 defined by the product engagement member 173 is again generally parallel to the plane P2 defined by the vertical edge portion of the body 113 of the linear motor assembly 103 to which the product engagement assembly 111 is attached.

Following engagement of the containers C, the product engagement assembly 111 can move along the straight portion 117 of the linear motor assembly 103. In one embodiment, the controller 125 can signal the coils 123 to produce magnetic fields such that the product engagement assembly 111 and the containers C engaged therewith can be accelerated to a preselected speed, e.g., a speed associated with a machine downstream from the system 100, e.g., a packaging machine or portion thereof.

Still referring to FIGS. 6A-6C, it will be understood that, as the product engagement assembly 111 reaches the end of the straight portion 117, the rollers 169 can engage a portion of the cam track 186 in the upper track assembly 105 that causes the arms 167 to engage the sides of the channel 165 of the respective mounts 159 and thereby cause the mount 159 to rotate about the pin 157 relative to the adapter plate 163/shuttle member 127 and to tilt/articulate such that the plane P1 is oblique to the plane P2 to facilitate disengagement of the product engagement member 173 from the containers C without impacting trailing containers C or a portion of a trailing product engagement member 173.

The aforementioned tilt/articulation of the product engagement member 173 is advantageous as compared to, for example, a product engagement member devoid of such capability for tilt/articulation, which could cause an outside edge thereof to impact containers C as moves between the curved portions 119, 121 and the straight portion 117 of the linear motor assembly 103, thus prompting the containers C to be suitably spaced apart to avoid such impact. Thus, the product engagement apparatuses 111 described herein are configured to provide a reconfigurable orientation/geometry that can allow a greater number of containers C to be run through the system 100 while minimizing spacing therebetween.

In one embodiment, containers C can be run through the system 100 in a generally continuous stream, and product engagement apparatuses can be serially advanced along the linear motor assembly 103 to engage respective containers C in a generally abutting relationship along the straight portion 117 of the linear motor assembly 103, e.g., such that a spacing between a trailing edge of a leading product engagement assembly 111 moving in the downstream machine direction M1 and a leading edge of a trailing product engagement assembly 111 moving in the downstream machine direction M1 is negligible. Such an arrangement can result in a capacity of the system 100 to process a maximal number of containers C while minimizing a number of product engagement apparatuses 111 due to the streamlining and minimization of spacing between adjacent containers C and adjacent product engagement apparatuses 111. In one embodiment, adjacent product engagement apparatuses 111 can be maintained in a predetermined spacing, for example, with a tie bar or other linkage, so as to move along the system 100 in tandem.

Figure 7:
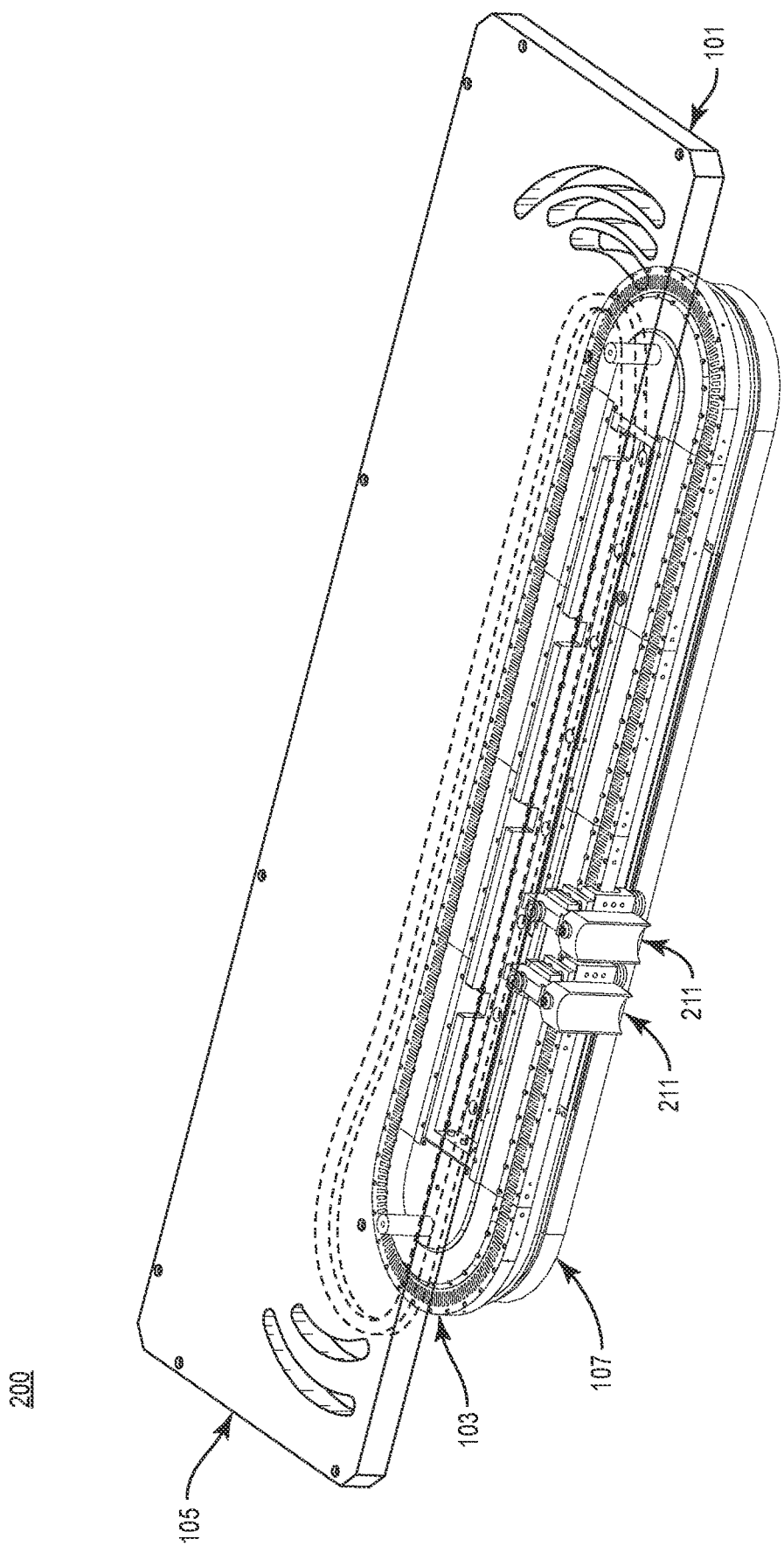
FIG. 7 is a perspective view of a product engagement system according to a second exemplary embodiment of the disclosure.

Turning to FIG. 7, a system and method for grouping and moving articles or containers C according to a second exemplary embodiment of the disclosure is generally designated 200. The system 200 can include one or more features that are the same or similar to those described above with regard to the system 100, and like or similar reference numerals are used to designate like or similar features.

As shown, the system 200 includes the linear motor assembly 103, the upper track assembly 105, and the lower track assembly 107. With additional reference to FIGS. 8 and 9, the system 200 can include the shuttle member 127 and an adapter assembly 251 coupled to the shuttle member 127.

The adapter assembly 251, as shown, can include an adapter plate 253 supported on the upper portion 141 of the shuttle member 127, and can include a series of apertures, e.g., for receiving fasteners for coupling the adapter plate 253 to the shuttle member 127.

The adapter assembly 251 can also include a mount 255 coupled to the adapter plate 253 and defining a channel 257 along an upper portion thereof for slidably receiving at least a portion of a rail 259 therealong. The rail 259 can be coupled, e.g., with a fastener, to an arm 261 positioned thereabove and defining a bore 263 for at least partially receiving the fastener 171 for the roller 169. In this regard, the arm 261 can be slidably coupled to the mount 255.

Figure 8:
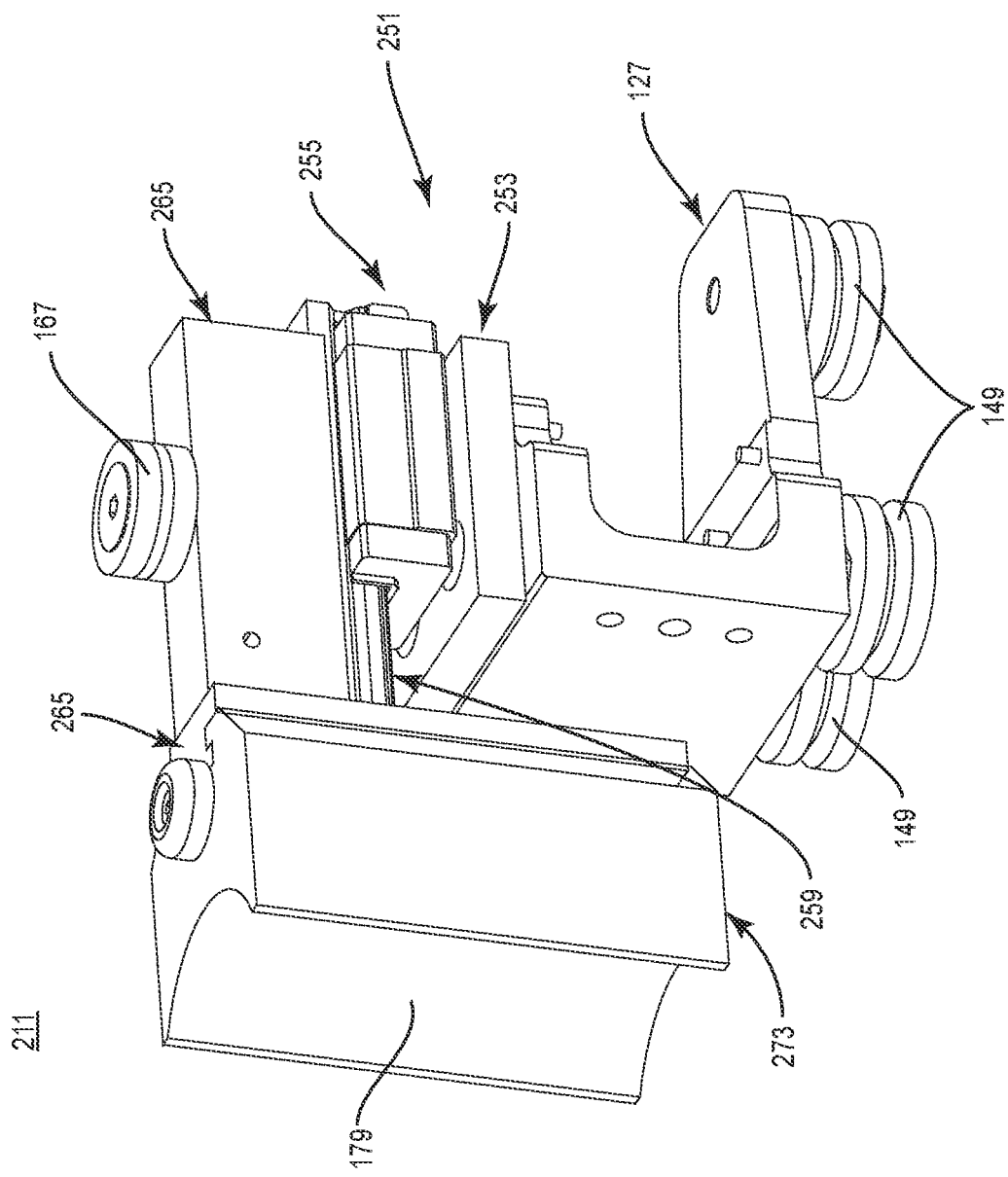
FIG. 8 is a perspective view of a product engagement assembly of the system of FIG. 7.
Figure 9:
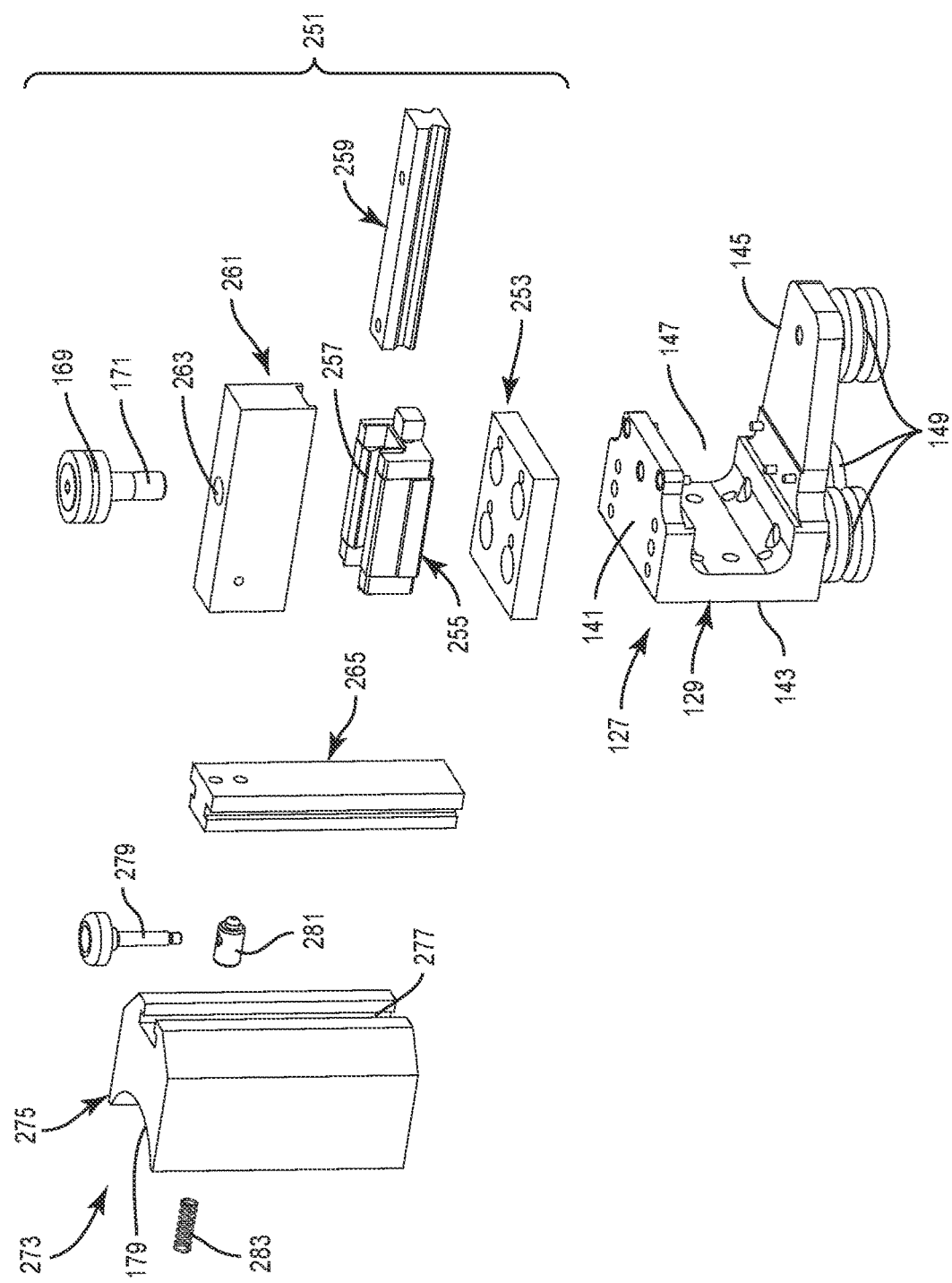
FIG. 9 is a parts-separated view of the product engagement assembly of FIG. 8.

Still referring to FIGS. 7-9, the adapter assembly 251 can also include a support 265 coupled to a frontal portion of the arm 261 and defining one or more flanges. A product engagement member 273, as shown, can have a body 275 defining a channel 277 for at least partially receiving the arm 261 therein to couple the product engagement member 273 to the remainder of the adapter assembly 251. As also shown, a locking pin 279 can be at least partially inserted into an aperture in a collar 281 with a biasing member 283 urging an internal component, e.g., a bearing or other component, into locking engagement with an interior surface of a bore in the support 265. In this regard, the locking pin 279 can be removed from the collar 281 to facilitate quick release of the product engagement member 273 to the remainder of the product engagement assembly 211.

Similar to the product engagement member 173 described above, the body 275 of the product engagement member 273 can have at least one recessed portion 179 to at least partially contour/engage a cylindrical container, e.g., a can or bottle. In one embodiment, the body 275 of the product engagement member 273 can be at least partially formed from a flexible/resilient material, e.g., a polymeric material, so as to provide a gripping or compressive engagement with a respective container C. It will be understood that the product engagement member 273 can be configured to engage a different number of containers C.

Figure 10:
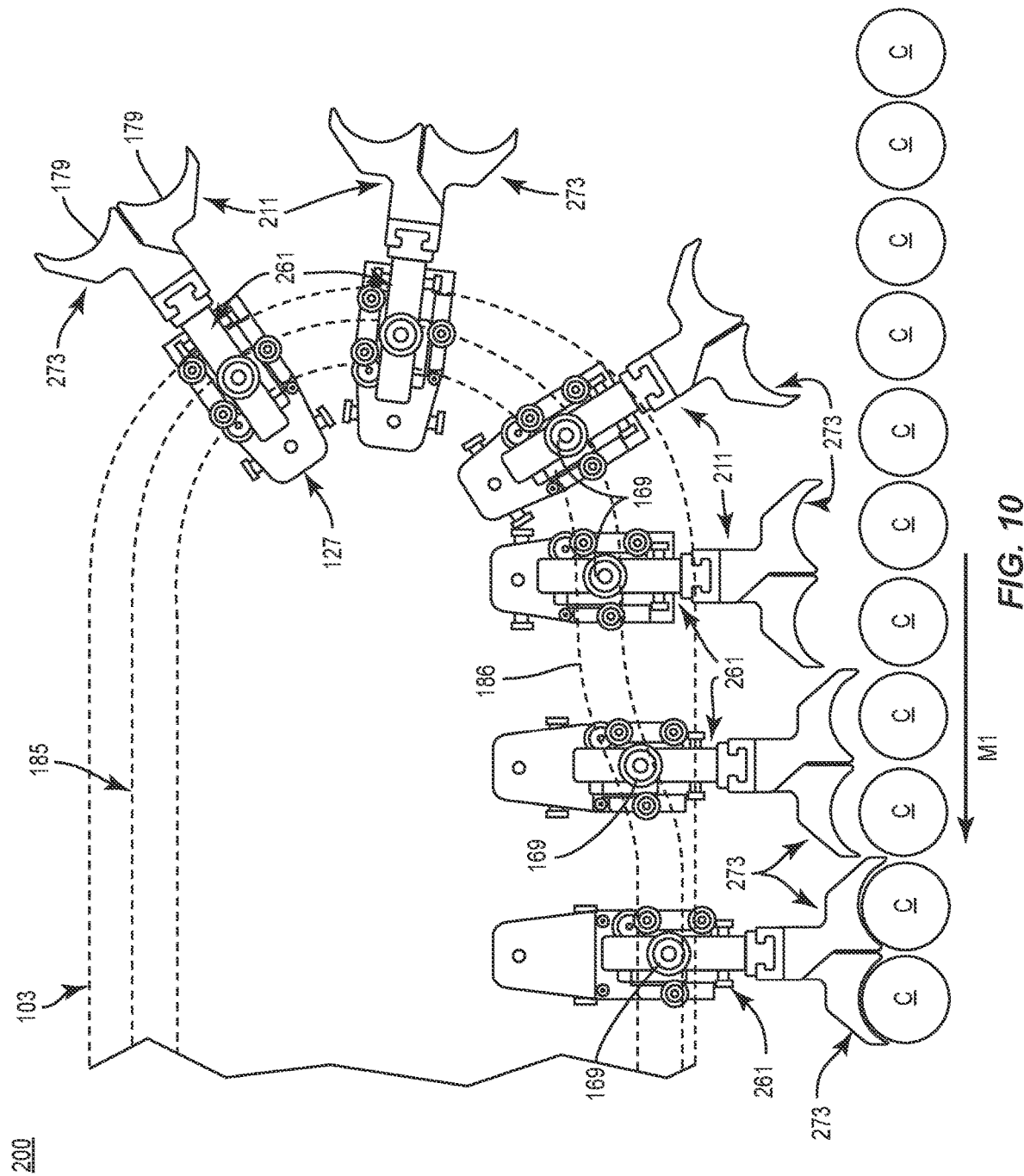
FIG. 10 is a plan schematic view of illustrating operations of the system of FIG. 8 to engage and move containers.
Figure 11:
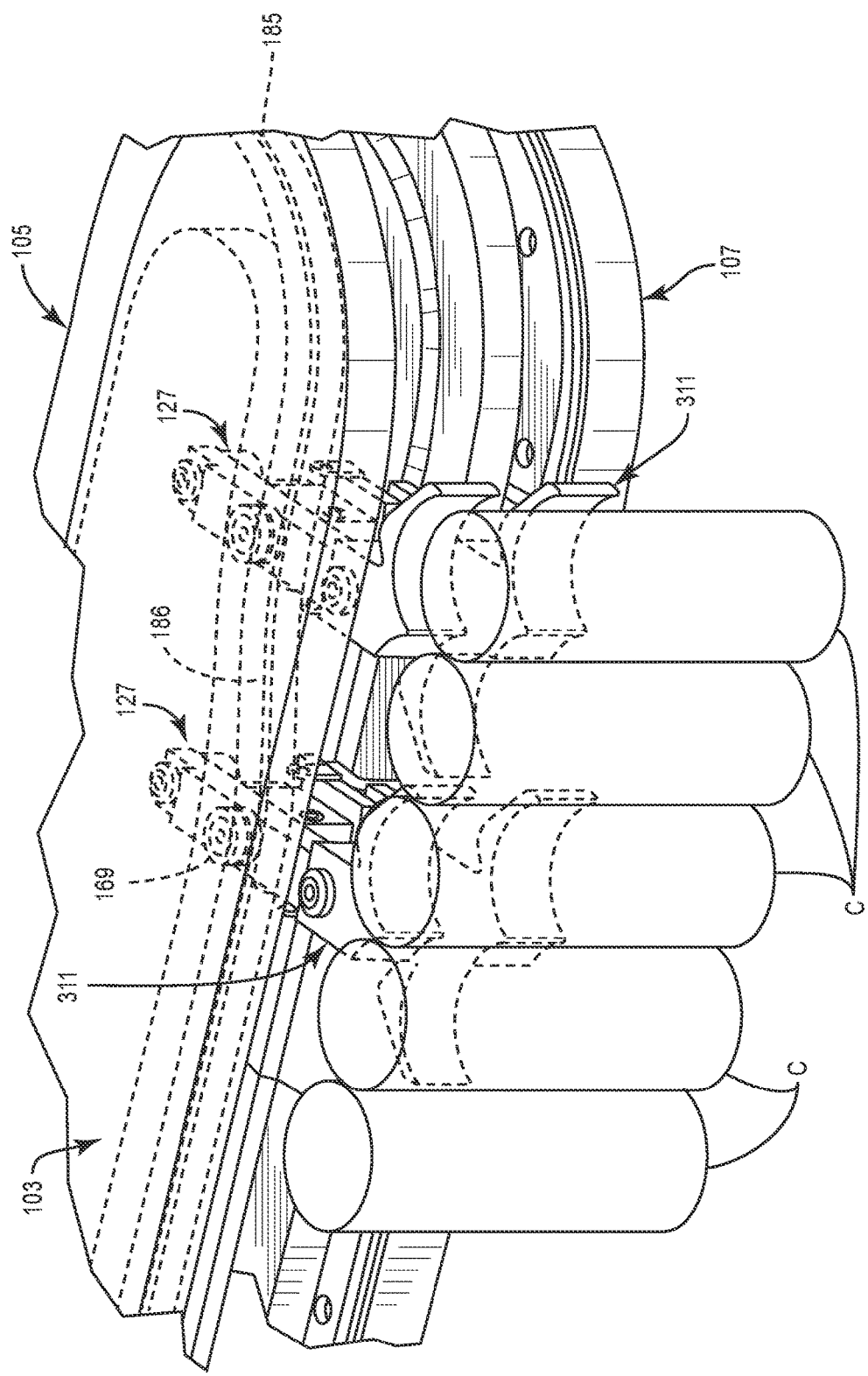
FIG. 11 is a perspective view of a portion of a product engagement system according to a third exemplary embodiment of the disclosure.
Figure 12C:
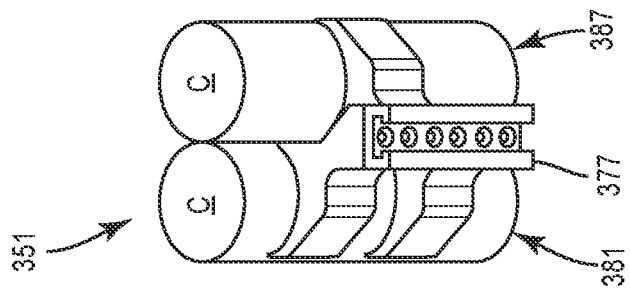
FIGS. 12A-12C illustrate various schematic configurations of the product engagement assemblies illustrated in FIG. 11.
Figure 12B:
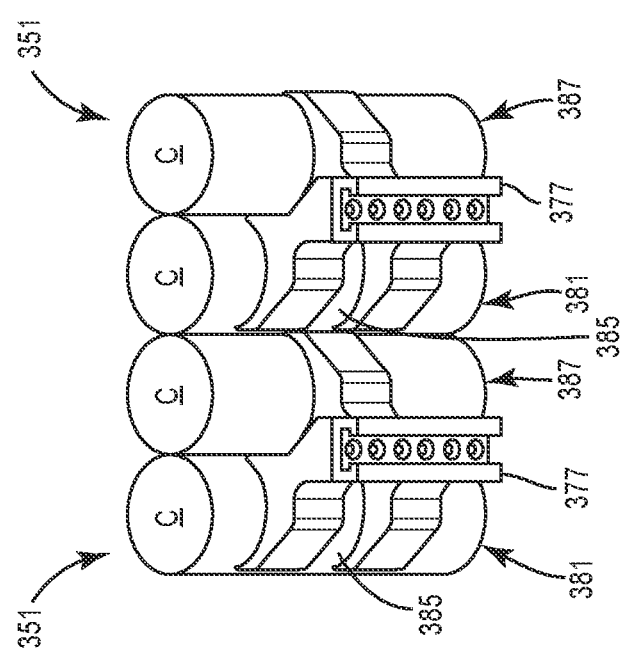
Figure 12A:
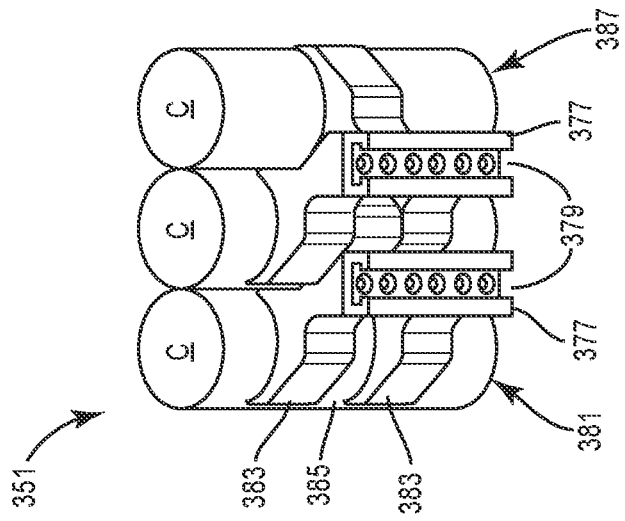

Referring additionally to FIG. 10, engagement/grouping, movement, and disengagement of containers C by the system 200 will be described according to an exemplary embodiment of the disclosure.

As containers C are fed into the system 200 in the downstream machine direction M1 so as to pass in proximity to the path of the product engagement apparatuses 211, the movement of the respective rollers 169 along the cam track 185 of the upper track assembly 105 can direct the position of the product adapter assembly 251 of the respective product engagement apparatuses 211. For example, as the rollers 169 move along a portion 186 of the cam track 185 that diverges from the edge profile of the body 113 of the linear motor assembly 103, the rollers 169 can push or pull the respective arms 261 and rails 259 coupled thereto to translate/slide along the respective channels 257 outwardly away from the respective shuttle members 127.

In this regard, the product engagement apparatuses 211 are reconfigurable between a retracted configuration, in which the product engagement member 273 is positioned closer to the shuttle member 127, and an extended configuration, in which the product engagement member 273 is positioned further from the shuttle member 127.

Accordingly, the aforementioned extension of the product engagement members 273 relative to the shuttle members 127 as the product engagement members 273 approach the straight portion 117 of the linear motor assembly 103 can maintain a clearance between the product engagement apparatuses 211 and the stream of containers C such that the product engagement members 273 are free from engagement with containers C adjacent the straight portion 117 of the linear motor assembly 103 until the rollers 169 engage a portion 186 of the cam track 185 that urges the arms 261 and rails 259 to slide outwardly along the respective mounts 255 such that the respective product engagement member 273 contacts the respective containers C.

Following engagement of the containers C, the product engagement assembly 211 can move along the straight portion 117 of the linear motor assembly 103. In one embodiment, the controller 125 can signal the coils 123 to produce magnetic fields such that the product engagement assembly 211 and the containers C engaged therewith can be accelerated to a preselected speed, e.g., a speed associated with a machine downstream from the system 200, e.g., a packaging machine or portion thereof.

Still referring to FIG. 10, it will be understood that, as a product engagement assembly 211 reaches the end of the straight portion 117, the rollers 169 can engage a portion of the cam track 185 in the upper track assembly 105 that causes the arm 261 and rail 259 to slide inwardly along the mount 255 relative to the shuttle member 127 and to retract such that the product engagement member 273 disengages from the containers C with sufficient clearance to allow the product engagement assembly 211 to approach/move along the curved portion 121 of the linear motor assembly 103 without contacting trailing containers C or a portion of a trailing product engagement member 273.

The aforementioned extension/retraction of the product engagement member 273 is advantageous as compared to, for example, a product engagement member devoid of such capability for extension/retraction, which could cause an outside edge thereof to impact containers C as moves between the curved portions 119, 121 and the straight portion 117 of the linear motor assembly 103, thus prompting the containers C to be suitably spaced apart to avoid such impact. Thus, the product engagement apparatuses 211 described herein are configured to provide a reconfigurable profile that can allow a greater number of containers C to be run through the system 200 while minimizing spacing therebetween, with similar advantages as described above with regard to the system 100.

Turning to FIG. 11 and FIGS. 12A-12C, a system and method for grouping and moving articles or containers C according to a third exemplary embodiment of the disclosure is generally designated 300. The system 300 can include one or more features that are the same or similar to those described above with regard to the systems 100, 200, and like or similar reference numerals are used to designate like or similar features.

As shown, the system 300 includes the linear motor assembly 103, the upper track assembly 105, and the lower track assembly 107. The system 300 can include the shuttle member 127 and an adapter assembly 351 coupled to the shuttle member 127.

The adapter assembly 351, as shown, can include a product engagement member 373 having a body defining a mounting portion 377 for coupling to a portion of a product engagement assembly 311. In one embodiment, the mounting portion 377 can form a track or recess 379 for at least partially receiving a portion of the support 265 described above, with the remainder of the product engagement assembly 311 having features similar to those described above with regard to the product engagement assembly 211. In another embodiment, the product engagement member 373 can be configured for coupling to a portion of a differently-configured product engagement assembly, e.g., such as that described above with regard to the product engagement assembly 111.

Still referring to FIGS. 11 and 12A-12C, the product engagement member 373 can include a trailing end portion 381 including a pair of generally curved and vertically spaced apart arms 383 extending away from the mounting portion 377 for engaging a container C (broadly, "second container"). The vertical spacing of the arms 383 is such that a gap 385 is defined therebetween. The product engagement member 373 can also include a leading end portion 387 extending from an opposite side of the mounting portion 377 and including an arm 389 for engaging a container C (broadly, "first container"). As shown, the arm 389 of the leading end portion 387 of the product engagement member 373 is positioned so as to be at a vertical height between the arms 383 of the trailing end portion 381, e.g., aligned with the gap 385.

In this regard, and as shown, when a pair of product engagement assemblies 311 are positioned in a side-by-side relationship along a portion of the system 300, the arm 389 of the leading end portion 387 of a trailing product engagement member 373 can be positioned in the gap 385 between the arms 383 of the trailing end portion 381 of a leading product engagement member 373 so as to provide an overlap between adjacent product engagement assemblies 311 that can reduce space between product engagement assemblies 311 along the system 300.

For example, in the illustrated embodiment, each product engagement assembly 311 is configured to engage a pair of containers C, e.g., one container by the arm 389 of the leading end portion 387 and one container by the arms 383 of the trailing end portion 381. However, in a situation in which a grouping of three containers C is desired, a pair of product engagement assemblies 311 can be at least partially overlapped, with the arm 389 of the leading end portion 387 of the trailing product engagement member 373 positioned in the gap 385 between the arms 383 of the trailing end portion 381 of a leading product engagement member 373.

In such an arrangement, the arm 389 of the leading end portion 387 of the leading product engagement assembly 311 engages one container C, the arms 383 of the leading product engagement member 373 overlapped with the arm 389 of the trailing product engagement member 373 engages a second container C, and the arms 383 of the trailing end portion 381 of the trailing product engagement member 373 engages a third container C.

Accordingly, the above-described overlapping arrangement of adjacent product engagement members 373 allows for the reduction of spacing between adjacent product engagement assemblies 311 in instances in which a product engagement assembly 311 is to be loaded with less than a full complement of containers C, e.g., such that no empty product engagement features need create unused spacing on a leading or trailing end of product engagement assembly 311. Such space savings along the system 300 can allow a greater number of containers C to be processed through the system 300, as well as utilizing a minimized number of product engagement assemblies 311 to move such containers C. While each product engagement assembly 311 is shown as configured to engage a pair of containers, it will be understood that the product engagement assembly 311 can be configured to engage a different number of containers, e.g., via a different arrangement and/or number of arms.

It will be understood that the adapter portions 151, 251, 351 of the shuttle assemblies described herein can be coupled to differently-configured shuttle members/linear motor assemblies/track assemblies. For example, in one embodiment, a shuttle member can have a rail engagement portion and a shuttle portion coupled to the rail engagement portion. The rail engagement portion can include a body supporting one or more rollers positioned for at least partial insertion into grooves formed along rail portions of a linear motor assembly such that the need for engagement with a lower track assembly separate from the linear motor assembly is obviated.

Any of the features of the various embodiments of the disclosure can be combined with, replaced by, or otherwise configured with other features of other embodiments of the disclosure without departing from the scope of this disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of moving at least one container, the method comprising:
    positioning at least one container at an upstream end of a system having at least one track assembly, a linear motor assembly, and at least one product engagement assembly,
    the at least one product engagement assembly comprising a shuttle member movably engaged with the linear motor assembly and the at least one track assembly, and an adapter assembly coupled to the shuttle member and comprising a product engagement member;
    moving the at least one product engagement assembly at least partially along the linear motor assembly;
    articulating the product engagement member relative to the shuttle member such that the product engagement member is positioned for engagement with the at least one container; and
    engaging the at least one container with the product engagement member.

2. The method of claim 1, wherein the adapter assembly comprises at least one roller supported on an arm coupled to a mount, the mount rotatably coupled to the shuttle member and supporting the product engagement member, the method further engages positioning the at least one roller in a cam track defined in the at least one track assembly.

3. The method of claim 2, wherein the method further comprises moving the at least one roller along the cam track to cause the arm to rotate the mount relative to the shuttle member such that articulating the product engagement member comprises pivoting the product engagement member relative to the shuttle member.

4. The method of claim 3, wherein vertical portions of the product engagement member define a first plane, vertical portions of the linear motor assembly overlapping the at least one product engagement assembly define a second plane, and articulating the product engagement member relative to the shuttle member comprises obliquely positioning the first plane relative to the second plane.

5. The method of claim 1, wherein the adapter assembly comprises at least one roller supported on an arm slidably coupled to a mount attached to the shuttle member, the mount supporting the product engagement member, the method further engages positioning the at least one roller in a cam track defined in the at least one track assembly.

6. The method of claim 5, wherein the method further comprises moving the at least one roller along the cam track to cause the arm to slide along the mount relative to the shuttle member such that articulating the product engagement member comprises translating the product engagement member relative to the shuttle member.

7. The method of claim 1, wherein the system comprises a plurality of coils supported on the linear motor assembly, and the method further comprises energizing the plurality of coils to produce at least one magnetic field to propel the at least one product engagement assembly at least partially along the linear motor assembly.

8. The method of claim 1, wherein the product engagement member comprises at least one recessed portion, and the engaging the at least one container comprises at least partially receiving the at least one container in the at least one recessed portion of the product engagement member.

9. The method of claim 8, wherein the at least one container is a first container and the at least one recessed portion of the product engagement member is a first recessed portion at a leading end portion of the product engagement member, and the method further comprises at least partially receiving a second container in a second recessed portion of the product engagement member at a trailing end portion of the product engagement member.

10. The method of claim 9, wherein at least one of the leading end portion and the trailing end portion of the product engagement member comprises a plurality of product engagement arms vertically spaced apart by a respective gap and at least partially engaging the respective container, and the other of the leading end portion and the trailing end portion of the product engagement member comprises at least one product engagement arm aligned with the respective gap.

11. A system for moving at least one container, the system comprising:
   at least one track assembly;
   a linear motor assembly; and
   at least one at least one product engagement assembly comprising a shuttle member movably engaged with the linear motor assembly and the at least one track assembly, and an adapter assembly coupled to the shuttle member and comprising a product engagement member movably coupled to the adapter assembly, the product engagement member for being moved relative to the adapter assembly to be positioned for at least partially receiving at least one container.

12. The system of claim 11, wherein the at least one track assembly defines a cam track, the adapter assembly comprises at least one roller supported on an arm coupled to a mount, the mount rotatably coupled to the shuttle member and supporting the product engagement member, the at least one roller positioned in the cam track.

13. The system of claim 12, wherein the arm is received in a channel defined in the mount such that the product engagement member is pivotable relative to the shuttle member based upon movement of the at least one roller along the cam track.

14. The system of claim 13, wherein vertical portions of the product engagement member define a first plane and vertical portions of the linear motor assembly overlapping the at least one product engagement assembly define a second plane such that the first plane is pivotable relative to the second plane.

15. The system of claim 11, wherein the at least one track assembly defines a cam track, the adapter assembly comprises at least one roller supported on an arm slidably coupled to a mount attached to the shuttle member, the mount supporting the product engagement member, the at least one roller positioned in the cam track.

16. The system of claim 15, wherein arm is coupled to a rail, and the mount defines a channel receiving the rail such that the product engagement member is translatable relative to the shuttle member based upon movement of the at least one roller along the cam track.

17. The system of claim 11, wherein the system comprises a plurality of coils supported on the linear motor assembly and the configured to receive an electric current to produce at least one magnetic field for propelling the at least one product engagement assembly at least partially along the linear motor assembly.

18. The system of claim 11, wherein the product engagement member comprises at least one recessed portion at least partially receiving the at least one container.

19. The system of claim 18, wherein the at least one recessed portion of the product engagement member is a first recessed portion at a leading end portion of the product engagement member for at least partially receiving a first container, and the product engagement member comprises a trailing end portion with a second recessed portion for at least partially receiving a second container.

20. The system of claim 19, wherein at least one of the leading end portion and the trailing end portion of the product engagement member comprises a plurality of product engagement arms vertically spaced apart by a respective gap for at least partially engaging a respective container, and the other of the leading end portion and the trailing end portion of the product engagement member comprises at least one product engagement arm aligned with the respective gap.

21. A product engagement assembly for moving at least one container, the product engagement assembly comprising:
   a shuttle member for being movably engaged with a linear motor assembly and at least one track assembly; and
   an adapter assembly coupled to the shuttle member and comprising a product engagement member movably coupled to the adapter assembly, the product engagement member for being moved relative to the adapter assembly to be positioned for at least partially receiving at least one container.

22. The product engagement assembly of claim 21, wherein the adapter assembly comprises at least one roller supported on an arm coupled to a mount, the mount rotatably coupled to the shuttle member and supporting the product engagement member, the at least one roller for being positioned in a cam track of the at least one track assembly.

23. The product engagement assembly of claim 22, wherein the arm is received in a channel defined in the mount such that the product engagement member is pivotable relative to the shuttle member.

24. The product engagement assembly of claim 21, wherein the adapter assembly comprises at least one roller supported on an arm slidably coupled to a mount attached to the shuttle member, the mount supporting the product engagement member, the at least one roller for being positioned in a cam track of the at least one track assembly.

25. The product engagement assembly of claim 24, wherein arm is coupled to a rail, and the mount defines a channel receiving the rail such that the product engagement member is translatable relative to the shuttle member.

26. The product engagement assembly of claim 21, wherein the product engagement member comprises at least one recessed portion at least partially receiving the at least one container.

27. The product engagement assembly of claim 26, wherein the at least one recessed portion of the product engagement member is a first recessed portion at a leading end portion of the product engagement member for at least partially receiving a first container, and the product engagement member comprises a trailing end portion with a second recessed portion for at least partially receiving a second container.

28. The product engagement assembly of claim 27, wherein at least one of the leading end portion and the trailing end portion of the product engagement member comprises a plurality of product engagement arms vertically spaced apart by a respective gap for at least partially engaging a respective container, and the other of the leading end portion and the trailing end portion of the product engagement member comprises at least one product engagement arm aligned with the respective gap.

* * * * *